United States Patent [19]

Johansson

[11] Patent Number: 4,973,894

[45] Date of Patent: Nov. 27, 1990

[54] METHOD AND ARRANGEMENT FOR OPTIMIZING OF THE FUNCTION OF A DOOR CLOSER

[75] Inventor: Sven-Eric Johansson, Torshälla, Sweden

[73] Assignee: Oy Wärtsilä Ab, Helsinki, Finland

[21] Appl. No.: 210,871

[22] Filed: Jun. 24, 1988

[30] Foreign Application Priority Data

Jul. 9, 1987 [FI] Finland ................................ 873035

[51] Int. Cl.[5] ................................ H02F 1/18

[52] U.S. Cl. ................................ 318/280; 318/266; 49/334

[58] Field of Search ............... 318/265, 266, 267, 269, 318/280–286, 626, 652, 651, 445, 461, 463, 467; 49/264, 266, 273, 274, 30, 31, 334, 336, 110, 274, 273, 379; 388/806, 810, 820, 822, 904

[56] References Cited

U.S. PATENT DOCUMENTS

| | | | |
|---|---|---|---|
| 2,645,806 | 7/1953 | Turney | 16/65 |
| 3,195,879 | 7/1965 | Bond et al. | 49/334 X |
| 3,864,875 | 2/1975 | Hewitt | 49/334 X |
| 4,045,914 | 9/1977 | Catlett | 49/334 |
| 4,090,113 | 5/1978 | Ogishi | 318/282 |
| 4,136,304 | 1/1979 | Baechler et al. | 318/372 |
| 4,145,641 | 3/1979 | Ozahi | 318/266 X |
| 4,333,270 | 6/1982 | Catlett | 49/336 |
| 4,501,090 | 2/1985 | Yoshida et al. | 49/264 |
| 4,673,848 | 6/1987 | Hagiwara et al. | 318/266 |
| 4,713,591 | 12/1987 | McCloskey | 318/282 X |

FOREIGN PATENT DOCUMENTS 2308459 5/1977 Fed. Rep. of Germany .

*Primary Examiner*—William M. Shoop, Jr.
*Assistant Examiner*—A. Jonathan Wysocki
*Attorney, Agent, or Firm*—Dellett, Smith-Hill and Bedell

[57] ABSTRACT

The invention relates to a method, and to an arrangement, for optimizing the operation of a door closer at different phases of opening and closing of the door. The door closer is provided with a force transmission shaft (1) turning in accordance with the movements of the door and with a spring element (2) operationally connected thereto. The opening of the door takes place against the force of the spring element (2). According to the invention, at the closing phase of the door the energy of the spring element (2), exceeding the return force of the spring element (2) needed to accomplish the desired closing movement of the door, is recovered through simultaneous braking of the closing movement of the door for the main part of the closing movement. When the door is only somewhat open any more, preferably under 5°, a final force securing the closing of the door is accomplished by making use of said recovered energy. For putting the method into practice, the door closer is provided with rotor (4), stator (5) and energy storing device (7), arranged to serve as an electric generator or as an electric motor as required.

26 Claims, 1 Drawing Sheet

METHOD AND ARRANGEMENT FOR OPTIMIZING OF THE FUNCTION OF A DOOR CLOSER

Figure 1:
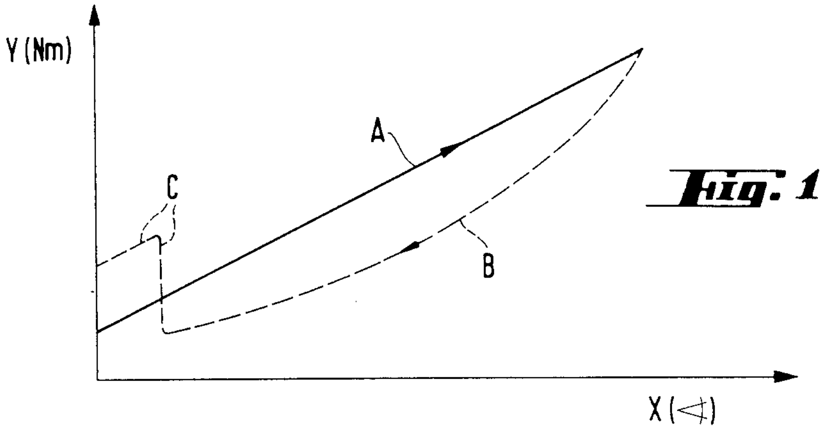

The invention relates to a method and to a door closer arrangement for putting the method into practice.

A conventional door closer is based on the use of a spring and on some pressure fluid such as oil. The door is opened against the force of the spring and the spring pushes the door shut respectively, whereby the pressure fluid is arranged to brake the closing of the door and, according to need, opening thereof with excessive speed as well. The door closer of this kind is afflicted with the following drawbacks, among others. The operation of the door closer is strongly dependent on temperature. This drawback can be alleviated by means of different thermostat valve arrangements, but these increase the manufacturing costs and, yet, are not able to fully eliminate the dependence on temperature. There are also other disadvantages related with oil such as the possibility of leakage and the necessity of providing door closer constructions which are precise and troublesome in view of manufacturing technique. Also from the viewpoint of fire protection the use of oil in a door closer constitutes a risk.

A considerable problem is further the unfavorable variation of the torsional moment the door closer exerts on the door at different phases of opening and closing of the door, for due to mechanical and hydraulic friction factors the torsional moment is in the opening phase considerably bigger than in the closing phase. As a consequence of this either a sufficiently stiff or strong spring has to be selected in order to secure closing of the door, whereby the opening of the door becomes rather heavy correspondingly, or the opening of the door is made easier for instance for children and the disabled by selecting a lighter spring, whereby in certain instances there is a risk about proper closing of the door. One solution for this problem is disclosed in the patent publication GB-2174143, according to which the torsional moment is changed at different phases of opening and closing of the door by removing the supporting point for one end of the articulated arm linking the door with the door frame and the other end thereof, respectively, being supported on the force transmission shaft of the door closer. The solution is rather costly and, in addition, the operation of the door closer is still based on using oil with the drawbacks involved.

An object of the invention is to eliminate the drawbacks in the known technology described above and to create a door closer with favorable operation, due to which the door is light to open, but in which, however, closing of the door is secured. An object of the invention is also to create such a door closer arrangement that puts into practice said objects set for the operation of the door closer and which can with advantage be used not only as a separate operation device for one door but also as a part of a bigger door system, the operation of which can be controlled by means of control signals from some central unit. Other objects of the invention as well as the advantages of the invention will be apparent from the specification further on.

In accordance with the invention an optimum door closer operation is accomplished by recovering, at the closing phase of the door, the energy of the spring element exceeding the return force of the spring element needed to accomplish the desired closing movement of the door, through simultaneous braking of the closing movement of the door for the main part of the closing movement. When the door is only somewhat open any more, preferably under 5°, a final force securing the closing of the door is accomplished by making use of said recovered energy.

For recovery of energy the door closer is provided with rotor means, arranged in force transmission connection with said force transmission shaft, and with stator means operationally connected with the rotor means, and with energy storing means, whereby under the influence of the turning movement of the force transmission shaft the rotor and stator means are jointly arranged to generate electric power to be stored in said energy storing means. On the other hand for the purpose of effecting on the turning movement of the force transmission shaft and, thus, on the movement of the door said rotor and stator means are arranged to operate as electric motor by supplying energy from said energy storing means to said rotor and stator means. By this means according to the invention the door closer is able to attend to its need for energy by itself.

Energy can also be recovered when the speed of the opening movement of the door exceeds a certain predetermined value. In that case the opening movement of the door is braked by means of said rotor and stator means and extra energy of the opening movement of the door is recovered.

The spring element to be used in the door closer arrangement according to the invention can with advantage be a torsion spring. In practice said rotor and stator means can be located inside of the torsion spring coaxially around said force transmission shaft or a shaft in force transmitting connection therewith. On the other hand in order to accomplish an integrated unit with compact design it is also feasible to have the torsion spring and the rotor and stator means located adjacent to each other.

For storing the recovered energy the door closer includes energy storing means, e.g. a NiCd-battery. The door closer includes also a control unit, e.g. a programmable microprocessor, which is arranged to control the rotor and stator means according to the requirements set for the different modes of operation thereof by arranging them on one hand to generate electric power through braking of the movement of the door according to need, and on the other hand to operate as motor at least at the end phase of the closing of the door when the door is open no more than preferably under 5°, so as to secure closing of the door.

The door closer includes further a detector giving an indication of the turning of the force transmission shaft and, thus, of the opening angle of the door at each time, which detector is arranged to send a corresponding control signal into the control unit. Hereby the control unit is aware of the state of the door and can also calculate, for instance on the basis of the pulses supplied by the detector and the time used, the velocity for the door movement, compare it with a preset value and, thus, if necessary, connect the rotor and stator means to operate as motor for braking the opening movement of the door. The door closer can also with advantage be provided with a brake apparatus, which is connected to the force transmission shaft or to a shaft in force transmitting connection therewith, and arranged to prevent turning of the force transmission shaft for keeping the door open in a desired position. The brake apparatus preferably receives its control from the control unit. Hereby the operation can with advantage be remote-controlled so that one needs only press a button.

In case the door closer is, under the control of the control unit, connectable to an external power source, by making use of which the control unit, on the basis of an external control signal to be fed thereto, is arranged to operate the rotor and stator means as motor, the door can be arranged to be opened and/or closed automatically according to need independent on the fact whether there is sufficiently energy in the energy storing means included in the door closer. Then the door closer can with advantage be adapted to be part of systems accomplished for automatic door operation, fire closing or for the like purpose.

Figure 2:
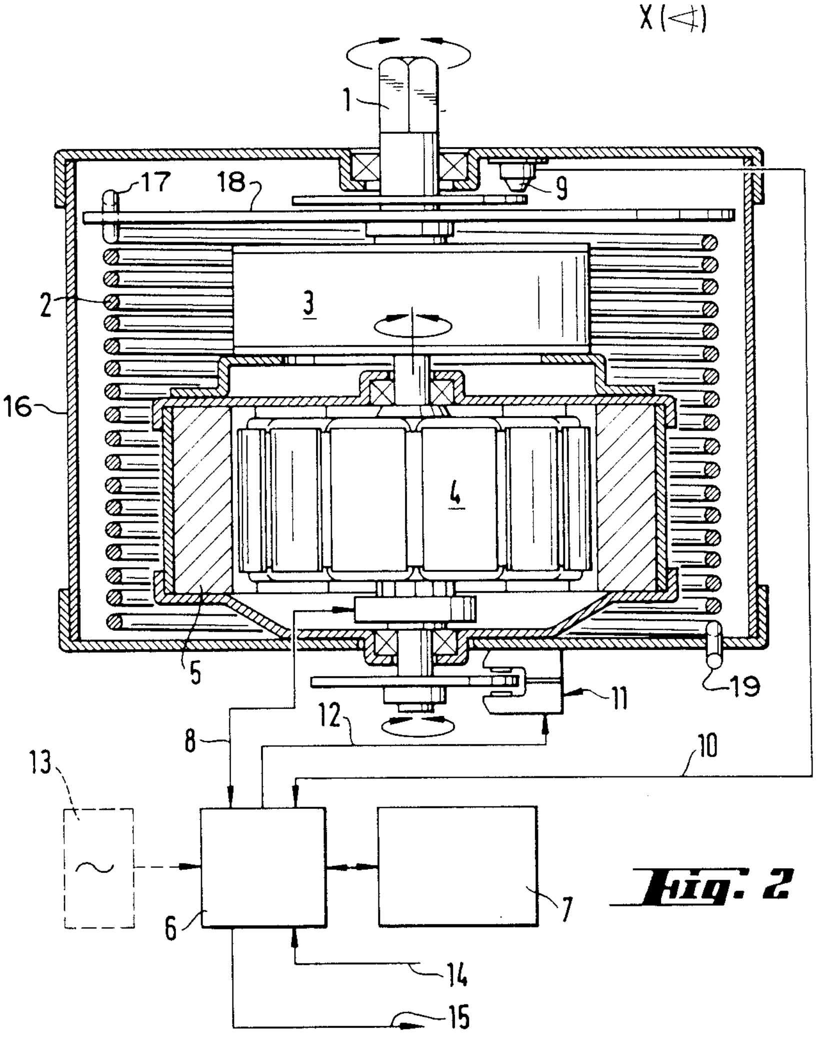

In the following the invention is described more in detail with reference to the attached drawing in which FIG. 1 shows schematically the desired torsional moment to be exerted on the door by the force transmission shaft of the door closer at different phases of opening and closing of the door, and FIG. 2 shows schematically a door closer arrangement according to the invention and the operation principles thereof.

In FIG. 1 Y-axis indicates the torsional moment exerted on the door by the force transmission shaft of the door closer and X-axis indicates the angle of opening of the door. Part A of the curve relates to the opening phase of the door. As can be seen the torsional moment is at its minimum at the beginning of the opening movement and due to the invention, it can be kept relatively low also in absolute terms, whereby the door is light to open. For the main part of the closing phase B the movement of the door is braked and, simultaneously, energy is recovered. Only at the very end of the closing phase, preferably when the door is open no more than under 5°, the torsional moment is essentially increased by making use of the recovered energy and hereby closing of the door is secured. Naturally, in addition to said recovered energy, or in some instances and according to need even instead thereof, also energy to be supplied from an external source can be used for this purpose.

With reference to FIG. 2 the reference numeral 1 indicates a force transmission shaft of the door closer arranged in force transmitting connection with a door (not shown in the figure) and turning relative to a housing 16 in accordance with the movements of the door. A torsion spring 2, has one end 17 coupled to the force transmission shaft 1 through a coupling member 18 and has its opposite end 19 engaged with the housing 16. Opening movement of the door takes place against the force of the torsion spring 2, which thereby takes care of closing the door. Further, connected to the force transmission shaft 1 via a gear box 3 there are rotor means 4. The door closer is also provided with stator means 5 arranged to be operationally connected with the rotor means 4. The door closer includes further a control unit 6 which attends to the control of the rotor and stator means 4 and 5 so that when required they operate as a unit braking the movement of the door, whereby simultaneously they generate electric power to be stored in energy storing means 7, or as an electric motor acting on the force transmission shaft 1 and thereby on the movement of the door by making use of the energy stored in the energy storing means 7 respectively. The control function provided by the control unit 6 for the rotor and stator means 4 and 5 as well as the recovery of energy to be stored in the energy storing means 7 are indicated with arrow 8.

The door closer is also provided with a detector 9 giving an indication of the turning of the force transmission shaft 1 and thereby of the opening angle of the door at each time and feeding a corresponding control signal 10 into the control unit 6. The detector 9 can with advantage operate so that one turn of the force transmission shaft 1 corresponds to a certain number of pulses of the detector. Then, in addition to the angular position of the door the control unit 6 can also easily determine the speed of the door movement on the basis of the number of pulses fed and the time used therefor. Further, the door closer includes a brake apparatus 11, by means of which turning of the force transmission shaft can be prevented and, thus, the door can be locked to a desired opening position. The operation of the brake apparatus is controlled with a control signal 12 sent by the control unit 6.

Normally the door closer according to FIG. 2 operates so that when the door is opened the control unit 6 takes care that the motor/generator formed jointly by the rotor and stator means 4 and 5 is disconnected from the power source, i.e. the energy storing means 7. Thereby the door is opened against the force of the torsion spring 2. If, however, the speed of the door movement as determined from the pulses of the detector 9 exceeds a certain speed limit value preprogrammed in the control unit 6, the control unit 6 connects the field coils of the motor/generator 4, 5 so that it operates in a way known per se as a generator thereby braking the turning movement of the force transmission shaft 1 and the opening of the door and simultaneously generating electric power to be stored in the energy storing means 7. When the speed of the door movement is again sufficiently low, the control unit 6 disconnects the motor/-generator 4,5 from the electric circuit, whereby the door opens again solely against the force of the torsion spring 2.

At the beginning of the closing movement of the door the control unit 6 again connects the motor/generator 4, 5 as described above to operate as a generator, which brakes the closing movement of the door, but however, does not prevent the torsion spring 2 from closing the door. The generated electric power is again stored in the energy storing means 7.

Quite at the end phase of the closing movement of the door the control unit 6 connects the motor/generator 4, 5 in a way known per se to operate as an electric motor, which makes use of the energy stored in the energy storing means 7 and assists the torsion spring 2 in closing the door. This is shown by phase C in FIG. 1, whereby, consequently, the torsional moment is considerably increased by means of the motor and, thus, closing of the door is secured.

In addition to what is described above a door closer arrangement according to the invention provides versatile possibilities of operation. When desired the door closer can also be connected to some external power source 13, whereby the motor/generator 4, 5 can temporarily or continuously be used also as a door operating motor independent on the sufficiency of the energy in the energy storing means 7. Temporary use can be provided for instance when the control unit 6 is connected to be part of a fire closing system, which is arranged to feed a control signal 14 to the control unit 6 for connection to the power source 13. On the other hand more or less continuous use can be provided when one wishes to use the door closer as part of an automatic door system. In this case the door closer can with advantage also be attached to be part of a more extensive door system, in which the opening and closing of even a plurality of doors can be controlled from a central control station on the basis of control signals 15 supplied from each control unit 6 and providing information on the state of the door in question. In this case the control signal 14 to be fed to the control unit 6 can relate for instance to mutual coordination of opening and closing of separate doors or to a command associated with central locking. As long as there is enough energy in the energy storing means 7, connection of the door closer to the external power source 13 is not necessarily always needed in every case. Operation of the rotor and stator means 4 and 5 as a motor as described above does not exclude alternative operation thereof as a generator braking the movement of the door according to need.

The motor/generator 4, 5 can favorably be a DC-motor provided with a permanent magnet, whereby the rotor can serve as a coil providing a magnetic field and the stator as a permanent magnet respectively. The gear box 3 for its part can favorably be a planetary gear, the gear ratio of which is for instance on the order of 100:1. The control unit 6 can be a programmable microprocessor provided with auxiliary means as needed, e.g. for connecting and disconnecting electric circuits. As energy storing means 7 can be used e g. NiCd-battery. Other kinds of energy storing means such as capacitors are feasible as well. As external power source can be used according to need practically any means suitable for the purpose, e.g. additional storage battery, solar cells, public utility supply etc.

The invention in not limited to the embodiments shown but several modifications are feasible within the scope of the attached claims.

I claim:

1. A method for optimizing the operation of a door closer during different phases of opening and closing of a door, which door closer is provided with a force transmission shaft turning in accordance with the movements of the door and with a spring element operationally connected thereto and in which opening of the door takes place against the force of the spring element, said method including the steps of:

(a) during an initial part of the closing phase of the door, recovering energy of the spring element in excess of that needed to accomplish the desired closing movement of the door, by providing the door closer with rotor means in force transmission connection with said force transmission shaft, stator means operationally connected with the rotor means, and energy storage means, and arranging for the rotor means and stator means jointly to generate electric power in response to turning movement of the force transmission shaft, whereby the closing movement of the door is braked, (b) storing energy recovered in step (a) in said energy storage means, and (c) during a final part of the closing phase of the door, using energy stored in the energy storage means to apply a force to the door to secure the closing of the door.

2. A method according to claim 1, wherein step (c) is performed when the door is almost fully closed.

3. A method according to claim 2, wherein step (c) is performed when the door is open by less than about 5°.

4. A method according to claim 1, comprising braking the opening movement of the door when the speed of the opening movement exceeds a predetermined value by arranging for the rotor means and stator means jointly to generate electric power, and storing electrical energy generated by the rotor means and stator means in the energy storage means.

5. A method according to claim 1, wherein step (c) comprises arranging the rotor means and stator means to operate as a motor and supplying energy from the energy storage means to the motor to bring about rotation of the force transmission shaft.

6. A method according to claim 1, further comprising arranging the rotor means and the stator means to operate as a motor and connecting the motor to a power source independent of the energy storage means for opening or closing the door.

7. A door closer comprising:

a force transmission shaft, turning according to the movement of the door, 'a spring element operationally connected with the force transmission shaft so that opening of the door takes place against the force of the spring element, a dynamoelectric machine comprising rotor means arranged in force transmission connection with said force transmission shaft and stator means operationally connected with said rotor means, said dynamoelectric machine having a generator mode in which it brakes rotation of the force transmission shaft and generates electric energy and a motor mode in which it functions as an electric motor influencing the movement of the door, and energy storage means for storing energy generated by the dynamoelectric machine when in its generator mode and for supplying it back to the dynamoelectric machine when in its motor mode.

8. A door closer according to claim 7, wherein the spring element is a torsion spring.

9. A door closer according to claim 7, wherein the energy storage means comprise a NiCd battery.

10. A door closer according to claim 7, further comprising control means for controlling the dynamoelectric machine to place it selectively in either the motor mode or the generator mode.

11. A door closer according to claim 10, wherein the control means place the dynamoelectric machine in the motor mode when the door is undergoing closing movement and is almost fully closed.

12. A door closer according to claim 10, comprising a detector for generating a signal representative of the angular position of the force transmission shaft and providing that signal to the control means.

13. A door closer according to claim 10, comprising a frictional brake apparatus for resisting rotation of the force transmission shaft from a selected angular position.

14. A door closer according to claim 13, wherein the frictional brake apparatus is responsive to the control means.

15. A door closer according to claim 10, wherein the control means are operative in response to a control signal to place the rotor means and stator means in the motor mode and connect them to a power source independent of the storage means.

16. An energy recovery and utilization mechanism comprising:

housing means, a force transmission member supported by the housing means so as to be rotatable with respect thereto, a spring member effective between the force transmission member and the housing means to resist rotation of the force transmission member in a first sense from a predetermined angular position, a dynamoelectric machine comprising rotor means in force transmission connection with the force transmission member and stator means coupled to the housing means, the dynamoelectric machine having a generator mode of operation in which kinetic energy of rotation of the force transmission member is converted to electrical energy and a motor mode of operation in which electrical energy can be converted to kinetic energy of rotation of the force transmission member, electrical energy storage means for storing electrical energy, and control means effective when the force transmission member has been rotated through a predetermined angle in said first sense from the predetermined position and is permitted to rotate in a second sense, opposite the first sense, under the influence of energy stored in the spring means, (a) during an initial part of the rotation, to place the dynamoelectric machine in the generator mode and deliver electrical energy generated thereby to the energy storage means for storage, and (b) during a final part of the rotation, to place the dynamoelectric machine in the motor mode and utilize electrical energy to apply force to the rotor means to secure rotation of the force transmission member to said predetermined angular position.

17. A mechanism according to claim 16, wherein the control means are effective during the final part of the rotation in said second sense to utilize electrical energy stored in the energy storage means to apply force to the rotor means.

18. A mechanism according to claim 16, wherein the control means are effective when the speed of rotation of the force transmission member in said first sense exceeds a predetermined value to place the dynamoelectric machine in the generator mode thereby to both brake the rotation of the force transmission member and generate electrical energy.

19. A mechanism according to claim 18, wherein the control means are effective when the dynamoelectric machine generates electrical energy in response to rotation of the force transmission member in said first sense to deliver the electrical energy to the energy storage means for storage.

20. A mechanism according to claim 16, comprising means for applying electrical energy to the dynamoelectric machine from an external power source.

21. A mechanism according to claim 16, wherein the spring member is a torsion spring.

22. A mechanism according to claim 16, wherein the energy storage means comprise a secondary cell.

23. A mechanism according to claim 16, comprising a detector for generating a signal indicating the angular position of the force transmission member and providing that signal to the control means.

24. An apparatus according to claim 16, comprising brake means for resisting rotation of the force transmission member from a selected angular position.

25. A mechanism according to claim 24, wherein the brake means comprise a disc coupled to the rotor for rotation therewith, and means responsive to the control means for gripping the disc.

26. A mechanism according to claim 16, comprising gear means effective between the force transmission member and the rotor means, whereby the rotor means rotate at a substantially higher angular velocity than the force transmission member.

* * * * *